United States Patent [19]

Bogdany et al.

[11] Patent Number: 5,595,368
[45] Date of Patent: Jan. 21, 1997

[54] APPARATUS FOR PREVENTING SLIPPAGE IN PIPE COUPLINGS

[76] Inventors: Arthur Bogdany, 12110 Shropshire, Austin, Travis, Tex. 78711; Alfred G. Davey, 206 Hy Rd., Buda, Hays, Tex. 78610

[21] Appl. No.: 289,644

[22] Filed: Aug. 12, 1994

[51] Int. Cl.⁶ .............................. F16K 51/00; F16L 27/00
[52] U.S. Cl. .......................... 251/148; 137/515; 285/341; 285/382.7
[58] Field of Search .............................. 285/341, 382.7, 285/302; 251/148; 137/515

[56] References Cited

U.S. PATENT DOCUMENTS

| | | | |
|---|---|---|---|
| 1,536,869 | 5/1925 | Kizer | 137/515 X |
| 2,335,414 | 11/1943 | Hinrichs | 285/341 X |
| 2,364,447 | 12/1944 | Hynes | 285/341 X |

*Primary Examiner*—Kevin Lee
*Attorney, Agent, or Firm*—Kelly K. Kordzik; Winstead Sechrest & Minick P.C.

[57] ABSTRACT

An apparatus for preventing slippage of the ends of pipes, which may be broken, from within a Dresser-type coupling utilized for mending such breaks. A slip stop ring member is provided for preventing slippage of a washer to the end of the pipe.

29 Claims, 6 Drawing Sheets

5,595,368

APPARATUS FOR PREVENTING SLIPPAGE IN PIPE COUPLINGS

TECHNICAL FIELD OF THE INVENTION

The present invention relates in general to pipe couplings, and in particular, to an apparatus for preventing slippage of pipe couplings.

BACKGROUND OF THE INVENTION

Fluid transfer pipes often crack, or break, completely due to various causes, such as the shifting of ground with respect to buried water pipes. In such cases, it is often not feasible to replace the pipe, since the particular piece of pipe having the breakage may be of a considerable length, and access to the entire length of the pipe may not be practical. For example, when an underground water pipe breaks, it may not be practical or feasible to dig up the entire length of pipe to replace it.

As a result, it is more desirable to mend the crack or the break in the pipe. A cross-section of a conventional apparatus for doing so is illustrated in FIG. 1, which shows breakage 11 resulting in pipe portions 1 and 2.

Pipes 1 and 2 are physically separated enough in order to slip nuts 16 and 15 onto pipes 1 and 2, respectively. Then, slip washers 14 and 13 are slipped onto pipes 1 and 2, respectively. Next, sleeve 12 is slipped over both pipes 1 and 2 so that it covers break 11. Nuts 16 and 15 and sleeve 12 are threaded so that they mate. Furthermore, slip washers 14 and 13 concentrically abut nuts 16 and 15, respectively, at concentric locations 17 and 18. Furthermore, slip washers 13 and 14 concentrically abut sleeve 12 at locations 19 and 10, respectively. Nuts 16 and 15 are tightened onto sleeve 12.

The inner diameters of washers 13 and 14 are designed to match the outer diameters of pipes 1 and 2 in order to provide a "water tight" coupling. Washers 14 and 13 may be comprised of a rubber or plastic-like material. The pipes and the other various parts shown in FIG. 1 may be comprised of polyvinylchloride ("PVC"), copper, plastic, rubber or any other pipe material often used for the transfer of fluids, such as gasses and liquids.

The desired result of compression coupling 3 (often referred to in the art as a "Dresser coupling") shown in FIG. 1 is to provide a "water tight" coupling between the two ends of the broken pipe. The fluid may enter into the chamber created by break 11, but will be unable to escape from coupling 3 due to the engagement between washers 14 and 13 and nuts 16 and 15, respectfully.

The problem with coupling 3 is that the fluid flow may be under a considerable amount of pressure. As illustrated in FIG. 1, that fluid pressure will flow in a particular direction from pipe 1 to pipe 2, which will tend to force a separation between pipe 1 and pipe 2 because of breakage 11. Often, this force is great enough to cause a slippage between pipe 1 and washer 14 and/or pipe 2 and washer 13, thus eventually widening break 11 so that one of the ends of the pipes escapes past washers 14 and/or 13 of coupling 3.

Thus, there is a need in the art for a technique for preventing slippage of such compression pipe couplings.

SUMMARY OF THE INVENTION

It is an object of the present invention to provide an apparatus for mending broken pipes, or coupling two pipes, which does not allow for slippage of the pipe within the coupling resulting in a dismantling of the coupling.

In an attainment of the above object, the present invention utilizes a slip stop mounted to one or both pipes, or portions of a broken pipe, to be coupled so that the slip washer provided in a compression coupling does not slip off of one of the pipes, or portions of a broken pipe, resulting in a leakage of fluid. The slip stop, which can be made in any size to fit any size pipe, may be made of CPVC, PVC, steel, aluminum, pot metal, plastic glass, copper, bronze, or any material that is compatible with the type of pipe that is being served by the present invention. The slip stop is attached near the end(s) of the pipe(s) by various methods, such as set screws, cotter pins, brazing, internal keyway, glue, pop rivets, etc. Preferably, the inside diameter of the slip stop closely matches the outside diameter of the pipe.

In a preferred embodiment, the slip washers are mounted onto the pipe ends previous to mounting the slip stop. Additionally, the nuts are also slipped on to the ends of the pipe, and thereafter the compression coupling sleeve is slipped on and the ends of the pipes are placed in close proximity to each other so that they are covered by the sleeve. The nuts are then screwed on to the threaded ends of the sleeve as is conventionally done in such types of couplings.

The slip stops prevent passage of the washers from the ends of the pipe, thus preventing the entire coupling from slipping off either ends of the pipes.

In an alternative embodiment of the present invention, the slip stops may be formed in various ways to have beveled edges, ribbed sides, or wedged sides. Additionally, a hole may be provided within the slip stop for passage of a rivet or a screw in order to more firmly attach the slip stop to the pipe.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 2:
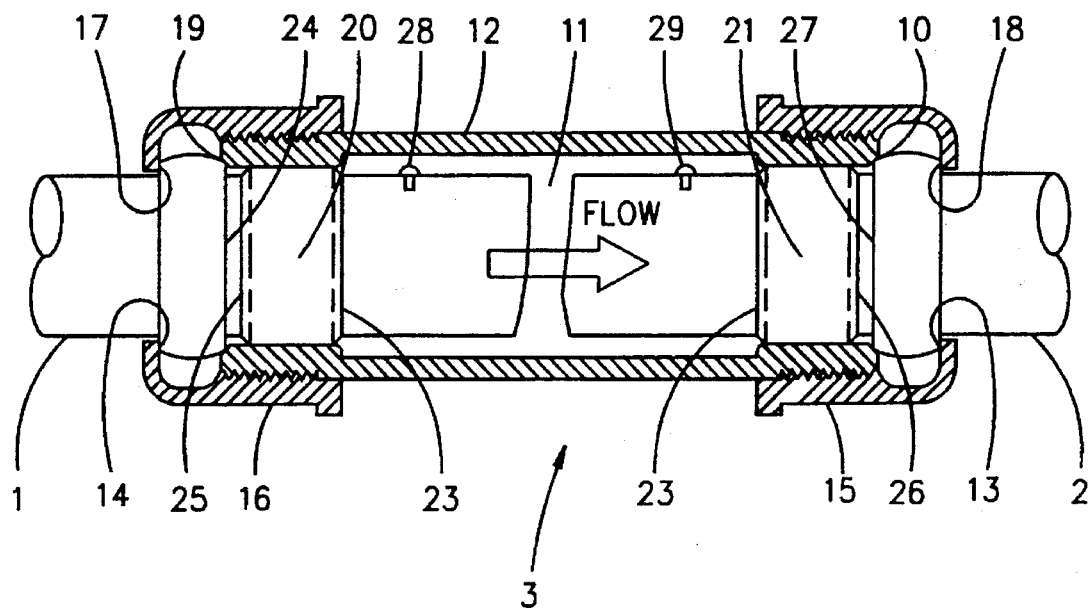
FIG. 2 illustrates a preferred embodiment of the present invention in conjunction with the compression coupling illustrated in FIG. 1.

Referring now to the drawings wherein depicted elements are not necessarily shown to scale and wherein like or similar elements are designated by the same reference numeral through the several views, FIG. 2 illustrates a cross-sectional view of a utilization of the present invention in conjunction with conventional compression coupling 3. Pipe ends 1 and 2 are a result of break 11 within a single pipe. Alternatively, pipes 1 and 2 could be two separate pipes, which are desired to be coupled. FIG. 2 also illustrates a fluid flow direction, which will tend to force pipes 1 and 2 apart, thus widening break 11.

Figure 1:
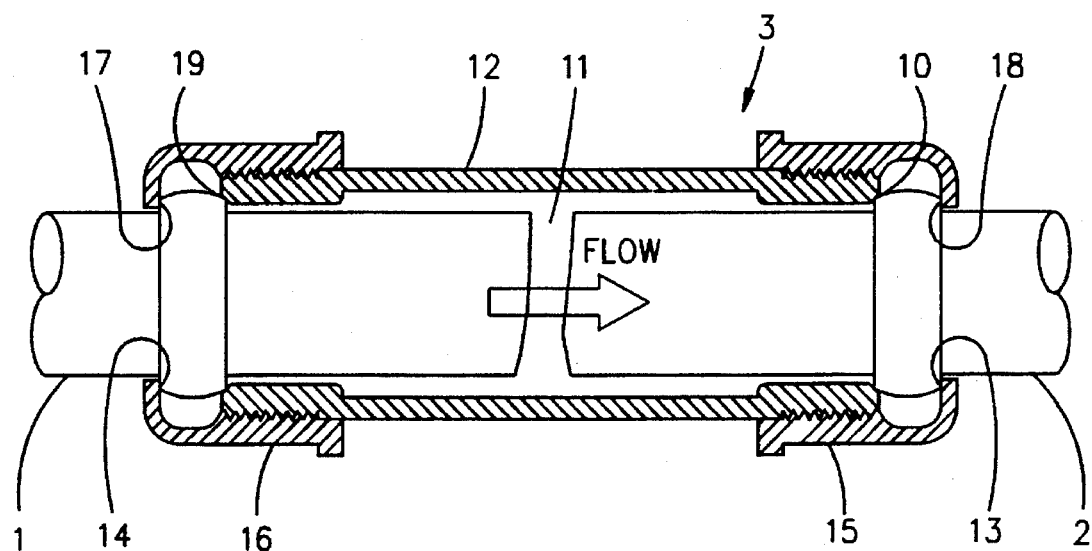
FIG. 1 illustrates a prior art conventional compression coupling.

Note that many of the elements are the same as described with respect to FIG. 1 above. The difference lies within slip stops 20 and 21, which are preferably attached to pipes 1 and 2, respectively. For example, glue may be placed at juncture 23 between slip stops 20 and 21 and pipes 1 and 2. As mentioned above, other methods may be utilized to firmly attach slip stops 20 and 21 to pipes 1 and 2. Such methods may include the use of conventional set screws, cotter pins, brazing, internal keyway, glue or pop rivets. Other equivalent methods may also be utilized.

Figure 3:
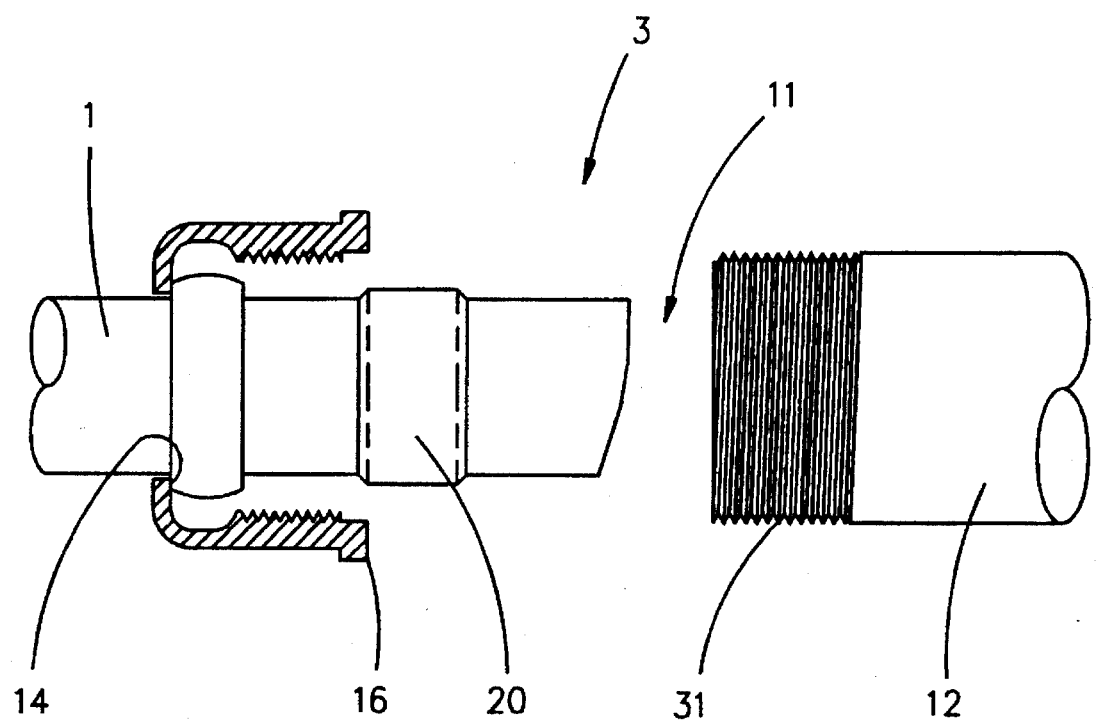
FIG. 3 illustrates a partially disassembled view of the present invention.

Referring to FIG. 3, there is illustrated partially disassembled coupling 3 utilizing the present invention. Essentially, nut 16 is concentrically slipped over pipe 1. Then, washer 14 is slipped over pipe 1. Next, slip stop 20 may be attached near the end of pipe 1. Thereafter, sleeve 12 is slipped over the end of pipe 1 and engaged with nut 16, by preferably screwing nut 16 onto threaded end 31 of sleeve 12. The identical procedure is performed for pipe end 2 (not shown).

The resulting assembly is illustrated in FIG. 2. Note that the fluid flow through pipes 1 and 2 will tend to cause a separation between pipes 1 and 2, which may result in slippage of either or both washer 14 or washer 13. For example, the flow may tend to attempt to force movement of washer 14 to the end of pipe 1. Such movement is prevented by slip stop ring 20 when edge 24 of washer 14 meets edge 25 of slip stop ring 20. This is caused by the fact that the inner diameter of washer 14 is preferably matched with the outer diameter of pipe 1, and the outer diameter of slip stop ring 20 is greater than the inner diameter of washer 14. Thus, washer 14 is prevented from moving to the end of pipe 1 since washer 14 is unable to slip over slip stop ring 20.

Likewise, the fluid flow may tend to force pipe 2 to the right thus causing slippage of washer 13 towards the end of pipe 2. Slip stop 21 prevents further movement of washer 13 in a manner similar to that described with respect to slip stop 20.

As a result of the foregoing, a widening of break 11 is prevented and coupling 3 remains surrounding and encompassing break 11.

In an alternative embodiment, stops 28 and 29 may be inserted through the walls of pipes 1 and 2, respectively, in order to also prevent slippage of slip stop rings 20 and 21, respectively, to the ends of pipes 1 and 2. Stops 28 and 29 may be comprised of rivets or set screws or any other equivalent means.

Figure 4:
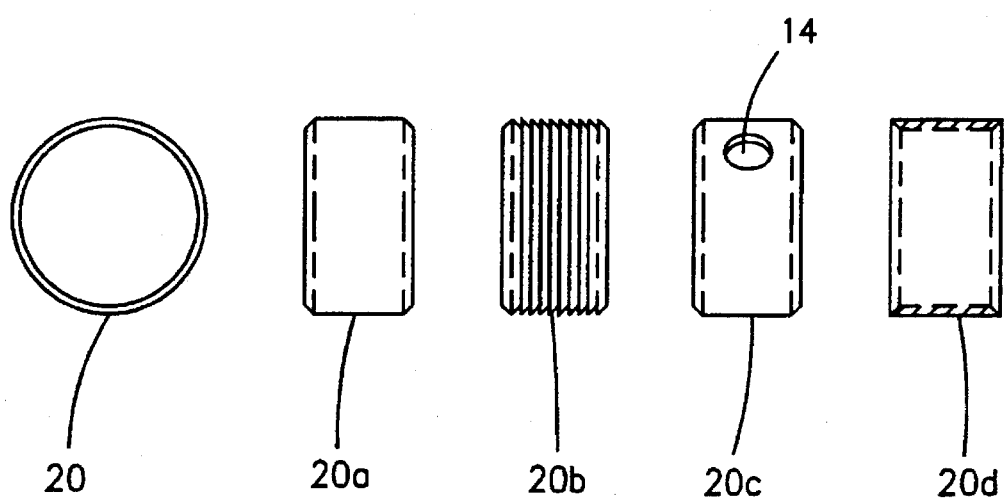
FIG. 4 illustrates alternative embodiments of the slip stop ring of the present invention.
Figure 5:
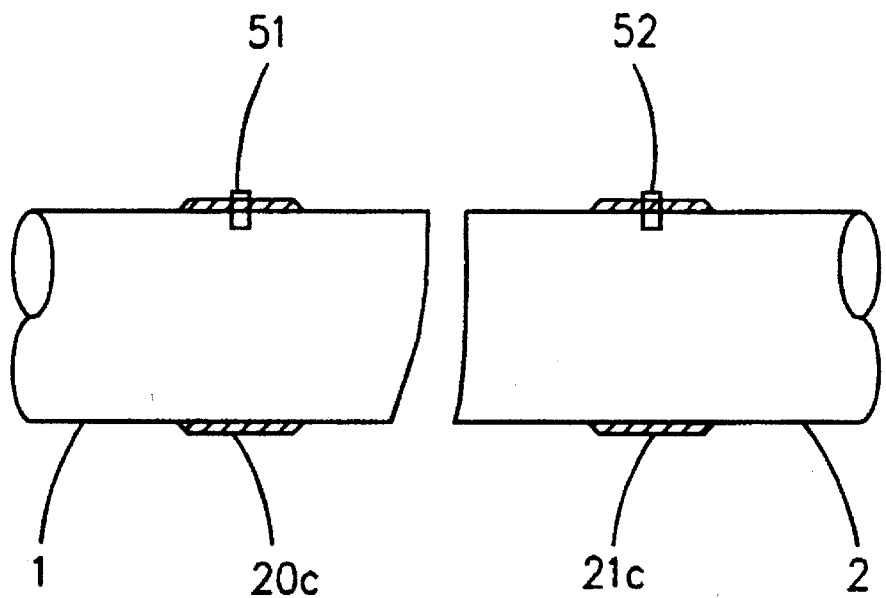
FIG. 5 illustrates an alternative embodiment of the present invention.

Referring next to FIG. 4, there are illustrated alternative embodiments of slip stop ring 20. 20a designates the particular slip stop illustrated in FIG. 2. Slip stop 20b incorporates a ribbed design to assist in preventing washer 14 from traveling over slip stop 20b. Slip stop 20c incorporates hole 41 for a possible insertion of a set screw or some other means for fastening slip stop 20c to pipe 1. This is further illustrated in the cross-sectional view in FIG. 5 wherein set screws 51 and 52 are utilized to fasten slip stops 20c and 21c, respectively, to pipes 1 and 2, respectively.

Figure 6:
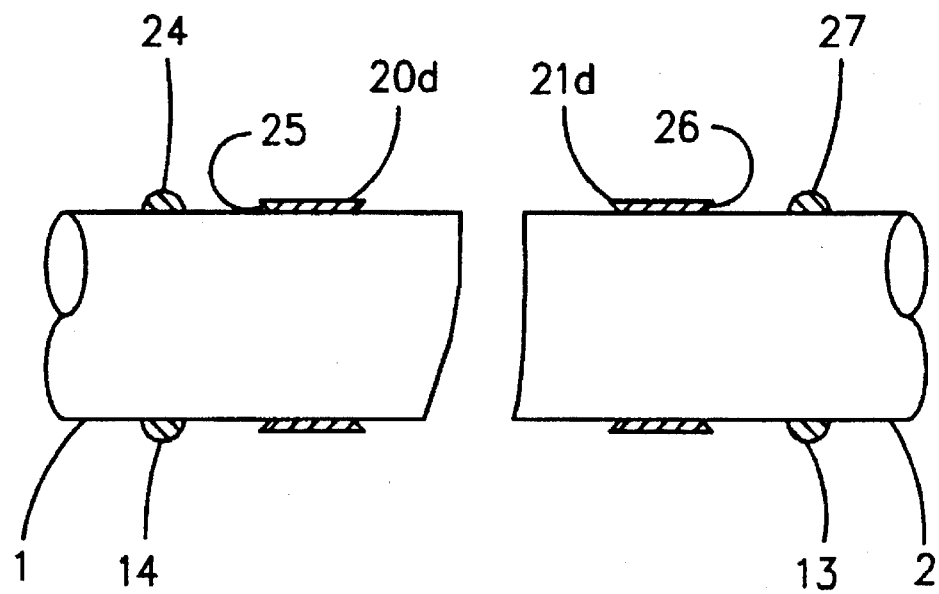
FIG. 6 illustrates an alternative embodiment of the present invention.

Slip stop 20d has an inverse bevel design. Referring to FIG. 6, there is illustrated a cross-sectional view of an implementation of slip stops 20d and 21d onto pipes 1 and 2. As a result of their inverse bevel design, when washers 14 and 13 attempt to slide towards the ends of pipes 1 and 2, respectively, edges 24 and 25, and 26 and 27 will engage. The inverse beveled edges 25 and 26 will tend to force edges 24 and 27, respectively, underneath slip stops 20d and 21d, respectively, instead of allowing washers 14 and 13 to glide over slip stops 20d and 21d, respectively.

As noted above, it is not necessary that an actual breakage occur within a particular pipe for the present invention to be utilized. Instead, it may be desired to merely couple two ends of pipe together using the present invention.

Figure 7:
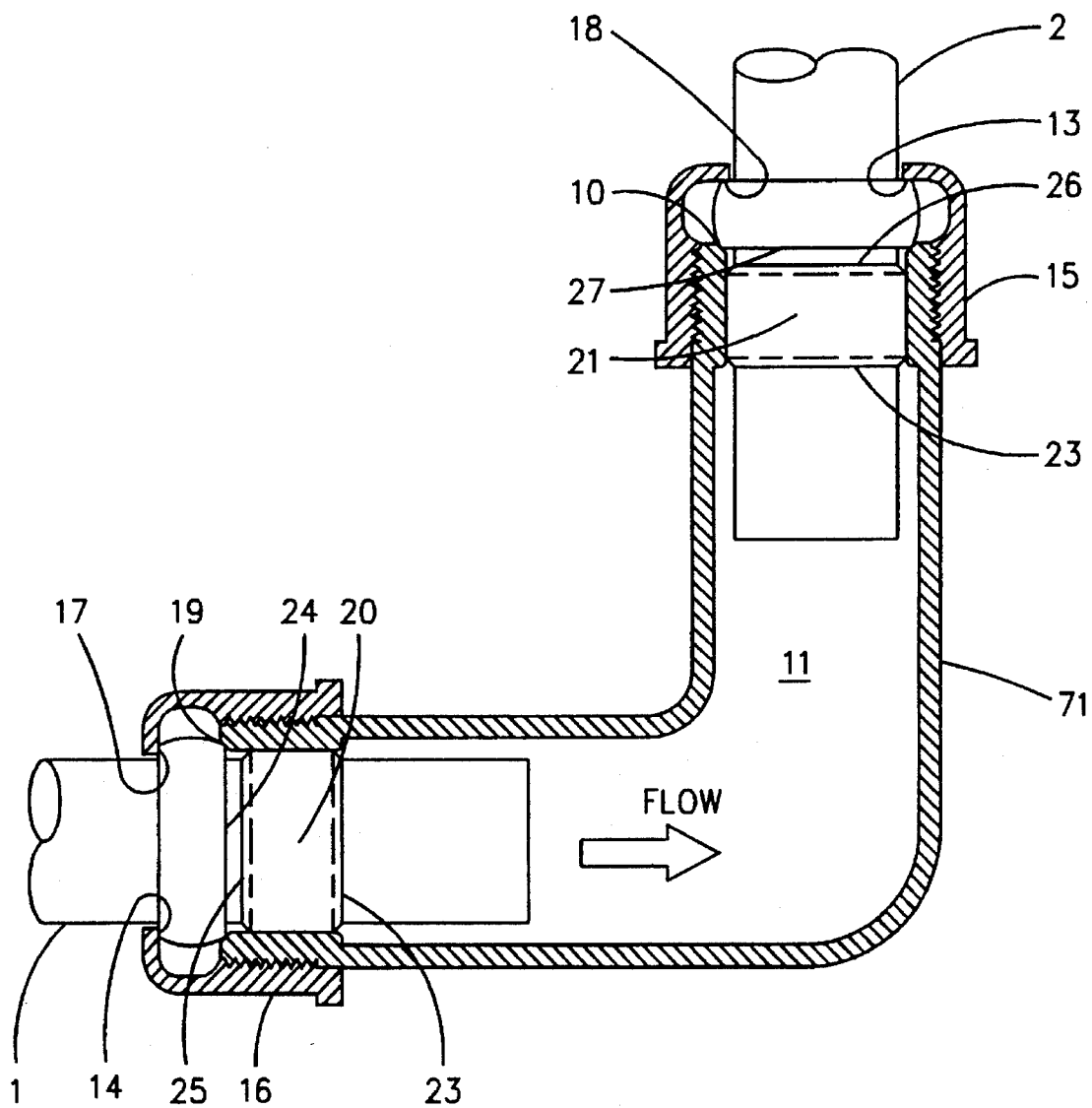
FIG. 7 illustrates an angled sleeve utilized within the present invention.

Referring next to FIG. 7, there is shown an alternative embodiment of the present invention, wherein all of the same parts shown in FIG. 2 are again shown, except that cylindrical sleeve 12 has been replaced by cylindrical elbow sleeve 71. The present invention proves to be useful in the situation illustrated in FIG. 7 with respect to elbow sleeve 71, since the fluid flow may tend to force sleeve 71 away from pipe end 1 because of the fluid flow against the inside wall of sleeve 71, or away from pipe end 2 if sleeve 71 is adequately secured with pipe end 1. Slip stops 20 and 21 again prevent the ends of pipes 1 and 2 from escaping from inside of coupling 7.

Figure 8:
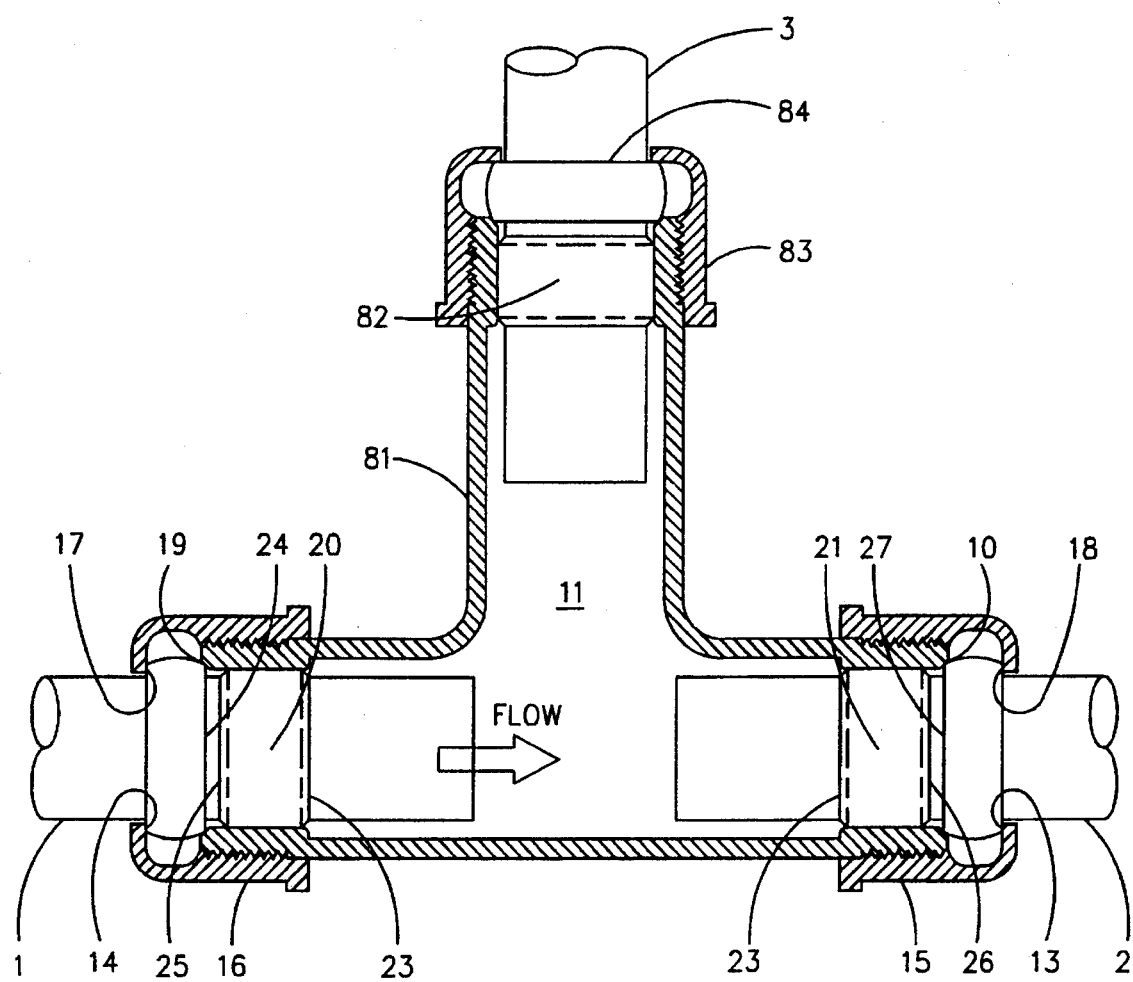
FIG. 8 illustrates a T-shaped sleeve utilized within the present invention.

Referring next to FIG. 8, there is illustrated another alternative embodiment of the present invention wherein sleeve 12 illustrated in FIG. 2 has been replaced by T-sleeve 81. Furthermore, in this instance, nut 83, washer 84 and slip stop 82 are provided for a coupling of pipe 3 to pipes 1 and 2 in a manner similar to that described above. Again, slip stops 20, 21 and 82 prevent the ends of pipes 1, 2 and 3, respectively, from escaping from within the inside of T-sleeve 8.

Figure 9:
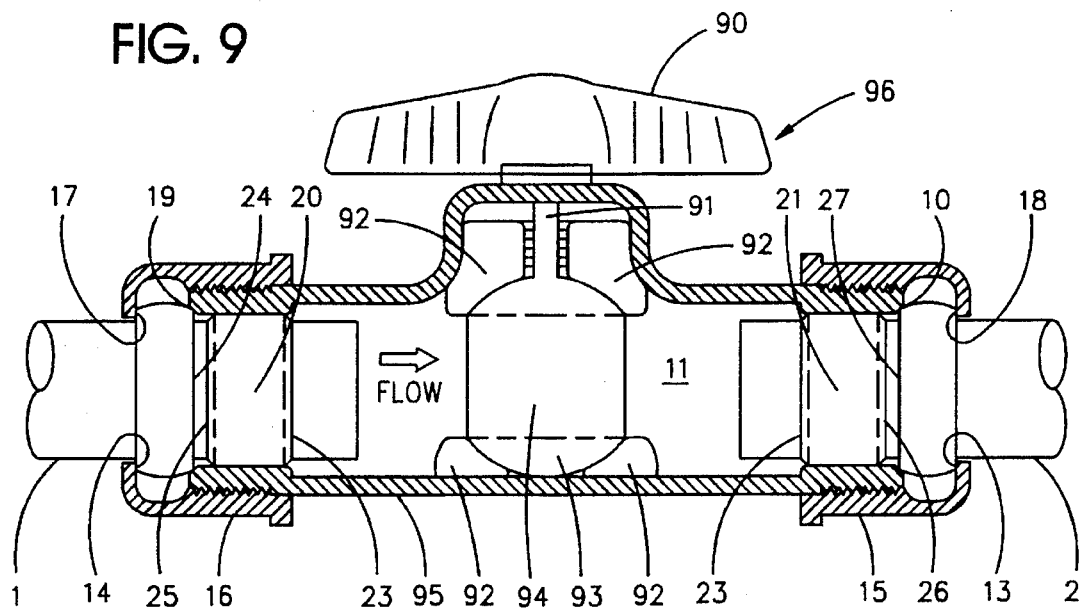
FIG. 9 illustrates a valve utilized within the present invention.

Referring next to FIG. 9, there is illustrated an alternative embodiment of the present invention wherein sleeve 12 illustrated in FIG. 2 has been replaced by sleeve 95, which includes typical valve 96 embodied therein. Valve 96 operates to control the flow of fluid through sleeve 95, and may be utilized to completely shut off the flow from pipe 1 to pipe 2. Valve 96 comprises handle 90, which may be turned to rotate shaft 91, which operates to rotate ball 93 which is surrounded by packing 92. Packing 92 also operates to prevent the flow of fluid around ball 93, so that the only means for fluid to flow from pipe 1 to pipe 2 is through opening 94. Naturally, various washers and other leak-preventing means may be utilized within valve 96 to prevent it from leaking water through the opening in sleeve 95 where shaft 91 meets handle 90. Ball 93 is essentially a round ball with hole 94 therethrough. Thus, when handle 90 is turned one quarter turn, opening 94 will be facing the sides of sleeve 95, thus preventing fluid flow from pipe 1 to pipe 2. Typical valve 96, commonly utilized within the industry, may be replaced by some other equivalent valve means.

Figure 10:
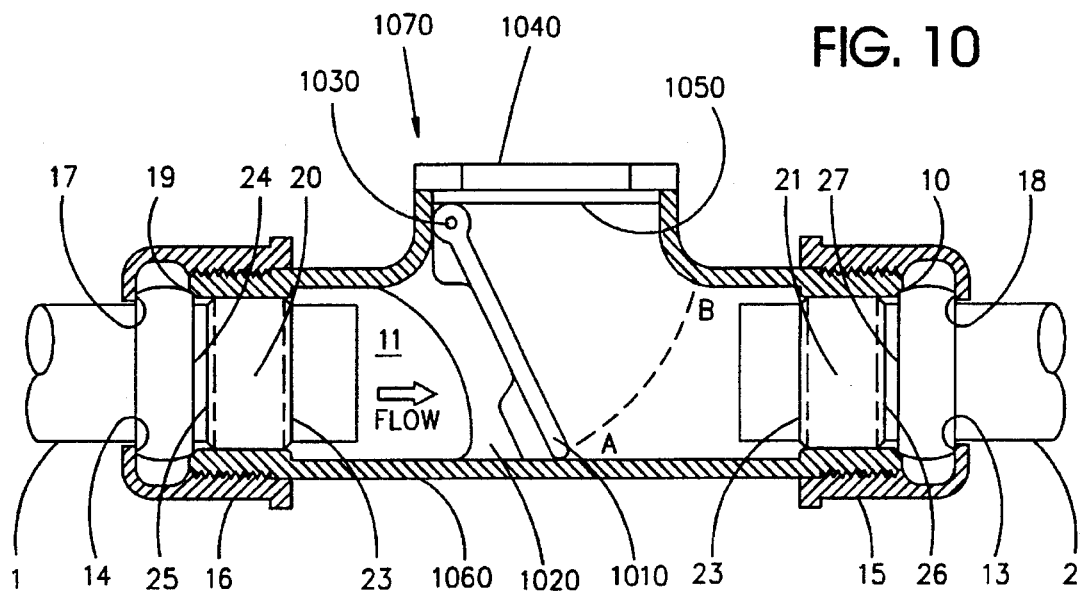
FIG. 10 illustrates a check valve utilized within the present invention.

Referring next to FIG. 10, there is illustrated an alternative embodiment of the present invention, wherein sleeve 12 has been replaced with sleeve 1060, which includes check valve 1070, which is a typical check valve utilized within the industry. Check gate 1010 is rotatably attached to the inside of sleeve 1060 by pin 1030, which is mounted inside of sleeve 1060. Seat 1020 provides a means for check gate 1010 to rest against when check gate 1010 is in position A.

Opening 1050 within sleeve 1060 is closed through nut 1040, which provides access to check valve 1070 from outside of sleeve 1060.

Fluid flow in the direction shown from pipe 1 to pipe 2 will be permitted by check valve 1070 because check gate 1010 will move upward to position B. However, fluid flow in the direction from pipe 2 to pipe 1 is not allowed since check gate 1010 prevents fluid flow in that direction when in position A.

Check vale 1070 may be replaced by any equivalent means for permitting fluid flow in only one direction.

Although the present invention and its advantages have been described in detail, it should be understood that various changes, substitutions and alterations can be made herein without departing from the spirit and scope of the invention as defined by the appended claims.

What is claimed is:

1. An apparatus adaptable for coupling pipes, said apparatus comprising:

a compression coupling adaptable for engaging ends of first and second pipes; and means, adaptable for coupling to said end of said first pipe, for preventing said compression coupling from disengaging from said end of said first pipe, wherein said compression coupling comprises:

first and second washers adaptable for engaging said ends of said first and second pipes, wherein an inner diameter of said first washer is substantially equal to an outer diameter of said end of said first pipe and an inner diameter of said second washer is substantially equal to an outer diameter of said end of said second pipe;

a cylindrical sleeve having an inner diameter equal to or greater than each of said outer diameters of said ends of said first and second pipes;

first and second cylindrical nuts adaptable for mating with said first and second washers respectively; and means for coupling said cylindrical sleeve with said first and second cylindrical nuts, wherein said preventing means comprises a cylindrical ring having an inner diameter substantially equal to an outer diameter of said first pipe.

2. The apparatus as recited in claim 1 wherein said ring has an inverse beveled edge.

3. The apparatus as recited in claim 1 wherein said ring has a ribbed surface.

4. The apparatus as recited in claim 1 wherein said ring is made of a similar material as said first pipe.

5. The apparatus as recited in claim 1 wherein said sleeve is angled.

6. The apparatus as recited in claim 1 wherein said sleeve is T-shaped and further comprising:

a third washer adaptable for engaging an end of a third pipe;

a third cylindrical nut adaptable for mating with said third washer; and means for coupling said third cylindrical nut with said sleeve.

7. The apparatus as recited in claim 1 wherein said compression coupling comprises:

a washer adaptable for engaging said end of said first pipe, wherein an inner diameter of said washer is substantially equal to an outer diameter of said end of said first pipe; and a cylindrical nut adaptable for mating with said washer.

8. A stop ring adaptable for preventing slippage of a Dresser coupling, said ring adaptable for sliding over an outside of an end of a pipe and having an inner diameter substantially equal to an outer diameter of said pipe, said ring having an outer diameter substantially large enough to prevent passage thereover by a cylindrical washer coupled around said pipe and part of said Dresser coupling.

9. The stop ring as recited in claim 8 wherein said ring has a ribbed surface.

10. An apparatus adaptable for coupling first and second ends of first and second pipes, said apparatus comprising:

first and second cylindrical washers adaptable for engaging said first and second pipes, respectively, near said first and second ends, wherein inner diameters of said first and second washers are substantially equal to outer diameters of said first and second pipes, respectively;

first and second cylindrical rings adaptable for engaging said first and second pipes, respectively, near said first and second ends and between said first and second ends and said first and second cylindrical washers, respectively, wherein inner diameters of said first and second cylindrical rings are substantially equal to outer diameters of said first and second pipes, respectively, and wherein an outer diameter of said first and second cylindrical rings are large enough to prevent passage thereover of said first and second cylindrical washers;

a cylindrically shaped sleeve; and first and second means adaptable for forming seals between said first and second cylindrical washers and said cylindrically shaped sleeve.

11. The apparatus as recited in claim 10, further comprising:

means adaptable for fastening said first and second cylindrical rings to said first and second pipes.

12. The apparatus as recited in claim 10 wherein said first and second means adaptable for forming seals comprise first and second cylindrical nuts having first and second distal and proximal ends, wherein said first and second distal ends firmly abut said first and second cylindrical washers, and wherein said first and second proximal ends are threaded so as to couple with threaded ends of said cylindrically shaped sleeve, wherein said first and second cylindrical washers are made of a rubber or plastic-like material.

13. The apparatus as recited in claim 10, further comprising:

means for preventing movement of said first and second cylindrical rings towards said first and second ends, respectively.

14. The apparatus as recited in claim 11 wherein said fastening means comprises glue.

15. The apparatus as recited in claim 11 wherein said fastening means comprises a rivet.

16. The apparatus as recited in claim 10 wherein said first and second rings have inverse beveled edges.

17. The apparatus as recited in claim 10 wherein said first and second rings have ribbed surfaces.

18. The apparatus as recited in claim 10 wherein said cylindrical sleeve is angled.

19. The apparatus as recited in claim 10 wherein said cylindrical sleeve is T-shaped and said apparatus further comprises:

a third cylindrical washer adaptable for engaging a third pipe near its end, wherein an inner diameter of said third washer is substantially equal to an outer diameter of said third pipe;

a third cylindrical ring adaptable for engaging said third pipe near said third end and between said third end and said third cylindrical washer, wherein an inner diameter of said third cylindrical ring is substantially equal to an outer diameter of said third pipe, and wherein an outer diameter of said third cylindrical ring is large enough to prevent passage thereover of said third cylindrical washer; and a third means adaptable for forming a seal between said third cylindrical washer and said T-shaped sleeve.

20. The apparatus as recited in claim 10 further comprising:

a valve means coupled to said cylindrically shaped sleeve.

21. The apparatus as recited in claim 20 wherein said valve means comprises a check valve.

22. An apparatus adaptable for coupling pipes, said apparatus comprising:

a compression coupling adaptable for engaging ends of first and second pipes; and means, adaptable for coupling to said end of said first pipe, for preventing said compression coupling from disengaging from said end of said first pipe, wherein said preventing means comprises a cylindrical ring having an inner diameter substantially equal to an outer diameter of said first pipe, wherein said ring has a ribbed surface.

23. An apparatus adaptable for coupling pipes, said apparatus comprising:

a compression coupling adaptable for engaging ends of first and second pipes; and means, adaptable for coupling to said end of said first pipe, for preventing said compression coupling from disengaging from said end of said first pipe, wherein that portion of said first pipe encompassed by said compression coupling has a substantially uniform outside diameter.

24. An apparatus adaptable for coupling pipes, said apparatus comprising:

a compression coupling adaptable for engaging ends of first and second pipes; and means, adaptable for coupling to said end of said first pipe, for preventing said compression coupling from disengaging from said end of said first pipe, wherein said preventing means comprises a cylindrical ring having an inner diameter substantially equal to an outer diameter of said first pipe, wherein said cylindrical ring is permanently attached to said first pipe.

25. A method for coupling ends of first and second pipes comprising the steps of:

1) slipping on said ends of said first and second pipes first and second cylindrical nuts;

2) slipping on said ends of said first and second pipes first and second washers adaptable for engaging said ends of said first and second pipes, wherein an inner diameter of said first washer is substantially equal to an outer diameter of said first pipe and an inner diameter of said second washer is substantially equal to an outer diameter of said second pipe;

3) slipping on said ends of said first and second pipes first and second cylindrical rings, wherein a first one of said cylindrical rings has an inner diameter substantially equal to an outer diameter of said first pipe and wherein a second one of said cylindrical rings has an inner diameter substantially equal to an outer diameter of said second pipe;

4) attaching said first and second cylindrical rings to said first and second pipes, respectively;

5) slipping over said ends of said first and second pipes a cylindrical sleeve having an inner diameter equal to or greater than each of said outer diameters of said ends of said first and second pipes; and 6) coupling said first and second cylindrical nuts to said ends of said cylindrical sleeve.

26. The method as recited in claim 25, wherein step 5) is performed immediately after step 4).

27. The method as recited in claim 25, wherein said ends of said first and second pipes are not flared.

28. The apparatus as recited in claim 1, wherein said compression coupling is a Dresser coupling.

29. A stop ring adaptable for preventing slippage of a compression coupling, said ring adaptable for sliding over an outside of an end of a pipe and having an inner diameter substantially equal to an outer diameter of said pipe, said ring having an outer diameter substantially large enough to prevent passage thereover by a cylindrical washer coupled around said pipe and part of said compression coupling, wherein said ring has a ribbed surface.

* * * * *